United States Patent
Han et al.

(10) Patent No.: US 11,088,539 B2
(45) Date of Patent: Aug. 10, 2021

(54) PRESSURE GENERATION APPARATUS AND METHOD FOR SUPERCONDUCTING POWER EQUIPMENT

(71) Applicant: KOREA ELECTRIC POWER CORPORATION, Naju-si (KR)

(72) Inventors: Young-Hee Han, Daejeon (KR); Byung-Jun Park, Daejeon (KR); Seong-Eun Yang, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 294 days.

(21) Appl. No.: 16/334,287

(22) PCT Filed: Nov. 23, 2016

(86) PCT No.: PCT/KR2016/013554
§ 371 (c)(1),
(2) Date: Mar. 18, 2019

(87) PCT Pub. No.: WO2018/056513
PCT Pub. Date: Mar. 29, 2018

(65) Prior Publication Data
US 2019/0214813 A1    Jul. 11, 2019

(30) Foreign Application Priority Data
Sep. 22, 2016 (KR) .................. 10-2016-0121622

(51) Int. Cl.
*F25D 17/02* (2006.01)
*H01B 12/16* (2006.01)
*H01F 6/04* (2006.01)
*H01F 6/00* (2006.01)
*H02H 9/02* (2006.01)

(52) U.S. Cl.
CPC ............. *H02H 9/023* (2013.01); *F25D 17/02* (2013.01); *H01B 12/16* (2013.01); *H01F 6/04* (2013.01); *H01F 2006/001* (2013.01); *Y02E 40/60* (2013.01)

(58) Field of Classification Search
CPC ..... H02H 9/023; H01F 6/04; H01F 2006/001; H01F 6/00; H01F 36/00; F25D 17/02; H01B 12/16; Y02E 40/60
USPC ........................................... 361/19
See application file for complete search history.

(56) References Cited

U.S. PATENT DOCUMENTS 6,629,426 B2 * 10/2003 Paul ..................... H01F 6/04
174/15.4
2003/0154734 A1    8/2003 Paul et al.

FOREIGN PATENT DOCUMENTS

| JP | 1997-09-129938 A | 5/1997 |
| KR | 10-2010-0080207 A | 7/2010 |
| KR | 10-2011-0085671 A | 7/2011 |
| KR | 10-2013-0033062 A | 4/2013 |

(Continued)

*Primary Examiner* — Dharti H Patel
(74) *Attorney, Agent, or Firm* — Foundation Law Group, LLP

(57) ABSTRACT

The present invention relates to pressure generation apparatus and method for superconducting power equipment and, more particularly, to pressure generation apparatus and method for superconducting power equipment, wherein a pressure system separately arranged to apply pressure to liquid nitrogen in the superconducting power equipment is disposed inside a pressure vessel.

14 Claims, 4 Drawing Sheets

(56) References Cited

FOREIGN PATENT DOCUMENTS

KR    10-2014-0128813 A    11/2014
KR    10-1558839 B1    10/2015

* cited by examiner

PRESSURE GENERATION APPARATUS AND METHOD FOR SUPERCONDUCTING POWER EQUIPMENT

CROSS REFERENCE TO RELATED PATENT APPLICATION

This application claims the benefit under 35 U.S.C. Section 371, of PCT International Application No. PCT/KR2016/013554, filed on Nov. 23, 2016, which claimed priority to Korean Patent Application No. KR 10-2016-0121622, filed on Sep. 22, 2016, the disclosures of which are hereby incorporated by the references.

TECHNICAL FIELD

The present invention relates to pressure generation apparatus and method for superconducting power equipment and, more particularly, to pressure generation apparatus and method for superconducting power equipment, in which a pressure system separately arranged to apply pressure to liquid nitrogen in superconducting power equipment is disposed inside a pressure vessel.

BACKGROUND ART

Generally, superconductivity refers to a phenomenon in which certain materials have zero electrical resistance and exhibit a completely semi-magnetic property in a specific condition (temperature, current density, magnetic flux density). Superconductivity is not always possible, but the electric resistance becomes zero only at a constant temperature (critical temperature $T_c$) or lower, a constant current density (critical current density $J_c$) or lower, and a constant magnetic field (critical magnetic field $H_c$) or lower. In particular, when the electric current density is higher than the threshold current density, superconductivity is lost and resistance appears. Unlike normal conductors, a superconductor having such superconductivity can transmit a large amount of current without loss even when current flows.

A superconducting fault current limiter is a device that limits a fault current generated in a power system by using a superconductor. A superconducting fault current limiter detects fault currents of several tens of times occurring in the event of a fault such as a wire break or a lightning strike within a thousandth of a second and thus applies impedance, thereby limiting the fault current.

It is possible to prevent large-scale accidents such as breakdown of power equipment due to fault current and wide-range power failure according to such a superconducting fault current limiter. In addition, in the steady state, there is no additional impedance, and even when the fault current increases, it is possible to limit the fault current without increasing the capacity of the existing circuit breaker, thereby preventing huge cost loss due to the circuit breaker replacement.

The superconducting fault current limiter is accommodated in a cryogenic pressure vessel in which liquid nitrogen is stored in order to maintain a superconducting state. For the purpose of electrical insulation, in the case of the high-voltage superconducting fault current limiter for power transmission or power distribution, the superconducting fault current limiter should be immersed into liquid nitrogen having a good insulation characteristic, keeping at a certain distance from a metal pressure vessel. On the other hand, when a quench occurs in a superconducting fault current limiter due to a fault current, a large amount of Joule heat is generated so that the surrounding liquid nitrogen can vaporize, thereby forming bubbles. Since the insulating properties of gaseous nitrogen are only a fraction of the liquid nitrogen, bubble formation due to liquid nitrogen vaporization during quenching can lead to dielectric breakdown of the superconducting fault current limiter. The most effective way to suppress such bubble formation in liquid nitrogen is to keep the liquid nitrogen in a supercooled state. Since liquid nitrogen boils at a temperature of about 77K under 1 atmosphere, the cryogenic pressure vessel should be maintained above 1 atmosphere in order to keep the liquid nitrogen in a supercooled state, and the liquid nitrogen has to remain below 77 K.

FIG. 1 shows a pressure generation system for superconducting power equipment in the related art.

In the related art, liquid nitrogen 6 in a pressure vessel 2 in which a superconducting fault current limiter 4 is accommodated is supplied to a refrigerant storage part 10, and a heater 8 is provided in the refrigerant storage part 10 to allow the liquid nitrogen 6 to be heated In such a structure, it is necessary to provide the refrigerant storage part 10 outside the pressure vessel 2, arrange a pipe connecting the pressure vessel 2 and the refrigerant storage part 10, provide a valve for supplying liquid and a controller, and so on, whereby there is a problem that the system is complicated and the installation area is also increased.

DISCLOSURE

Technical Problem

The present invention has been made to solve the above-mentioned problems, and it is an object of the present invention to achieve miniaturization of superconducting power equipment, in which a pressure system separately arranged outside a pressure vessel to apply pressure to liquid nitrogen in the superconducting power equipment is disposed inside a pressure vessel, thereby reducing the installation area of pressure tanks, cooling pipes, gas piping, valves, and the like that constitute the pressure system in the related art.

It is an object of the present invention that the pressure system is simplified by the above-described configuration to reduce the failure probability of the pressure system and make uniform the performance of the superconducting power equipment, thereby increasing reliability and contributing to stable power system operation.

Technical Solution

In order to achieve the above object, a pressure generation apparatus for superconducting power equipment according to the present invention, a pressure generation device is disposed inside a pressure vessel in which a superconducting fault current limiter and liquid nitrogen are stored, in order to apply pressure to the liquid nitrogen and thus maintain a pressure inside the pressure vessel.

The pressure vessel may be configured so that both ends of a cooling tank having a shape of a cylindrical chamber are formed as a dome portion having a dome shape.

The pressure generation device may be formed on a side of the dome portion on either end of both ends inside the pressure vessel.

The pressure generation device may include: a partition provided in a direction vertically traversing the dome portion, a heater provided between the partition and the dome portion; and a liquid nitrogen inlet provided on a lower side of the partition.

The pressure vessel may be divided into an evaporation part and a storage part by the partition.

A space between the partition and the dome portion may provide an evaporation part in which the liquid nitrogen is evaporated, and a space between the partition and the dome portion on the other side of the pressure vessel may provide the storage part in which the liquid nitrogen is stored.

A lower end of the partition may be in contact with a lower side of the dome portion, and an upper end of the partition is spaced at a certain distance with an upper side of the dome portion.

A height of the partition may be higher than a liquid level of the liquid nitrogen stored in the storage part.

A predetermined amount of the liquid nitrogen stored in the storage part may flow into the evaporation part through the liquid nitrogen inlet The liquid nitrogen flowed into the evaporation part may be evaporated by heating of the heater and is increased in volume, so that an equilibrium gas pressure inside the evaporation part is increased.

Gaseous nitrogen generated by evaporating the liquid nitrogen in the evaporation part may move into the storage part through a gas outlet, which is a space between an upper end of the partition and an upper side of the dome portion.

The gaseous nitrogen moved into the storage part may apply pressure to a liquid level of the liquid nitrogen in the storage part, so that a constant pressure is formed inside the pressure vessel.

The liquid nitrogen inlet may be provided with a backflow preventer to prevent the liquid nitrogen flowed into the evaporation part from flowing back to the storage part.

The partition may be configured with a thermal insulation material.

The partition may be formed with a double wall structure having a hollow shape.

In order to achieve the above objects, a pressure generation method according to the present invention includes:

moving liquid nitrogen stored in a storage part into an evaporation part through a liquid nitrogen inlet in a lower end of a partition;

heating the liquid nitrogen moved into the evaporation part by a heater inside the evaporation part;

increasing an equilibrium gas pressure inside the evaporation part as the liquid nitrogen is evaporated by heating of the heater and increase in volume;

moving gaseous nitrogen generated by evaporating the liquid nitrogen above a liquid level of the liquid nitrogen stored in the storage part through a gas outlet; and allowing the gaseous nitrogen to apply pressure to a liquid level of the liquid nitrogen stored in the storage part so that a constant pressure is formed inside the pressure vessel.

The method may further include after allowing the gaseous nitrogen to apply pressure to the liquid level of the liquid nitrogen stored in the storage part so that a constant pressure is formed inside the pressure vessel, allowing the gaseous nitrogen to be in contact with the liquid nitrogen and thus be liquefied.

Advantageous Effects

According to the present invention, it is possible to achieve miniaturization of superconducting power equipment by enabling a pressure system separately arranged outside a pressure vessel to apply pressure to liquid nitrogen in the superconducting power equipment to be disposed inside a pressure vessel, thereby reducing the installation area of pressure tanks, cooling pipes, gas piping, valves, and the like that constitute the pressure system in the related art.

In addition, since there is no valve for flow of the liquid nitrogen from the existing pressure tank into the pressure vessel so that it is not necessary to control the valve, there is an effect that the pressure system can be simplified.

Accordingly, there is an effect that the failure probability of the pressure system is reduced and the performance of the superconducting power equipment is made uniform by above-described configuration, thereby increasing reliability and contributing to stable power system operation.

In addition, according to the above-described effects, there is an effect that it is possible to contribute to the expansion and spreading of various superconducting power equipment.

MODE FOR INVENTION

Figure 1:
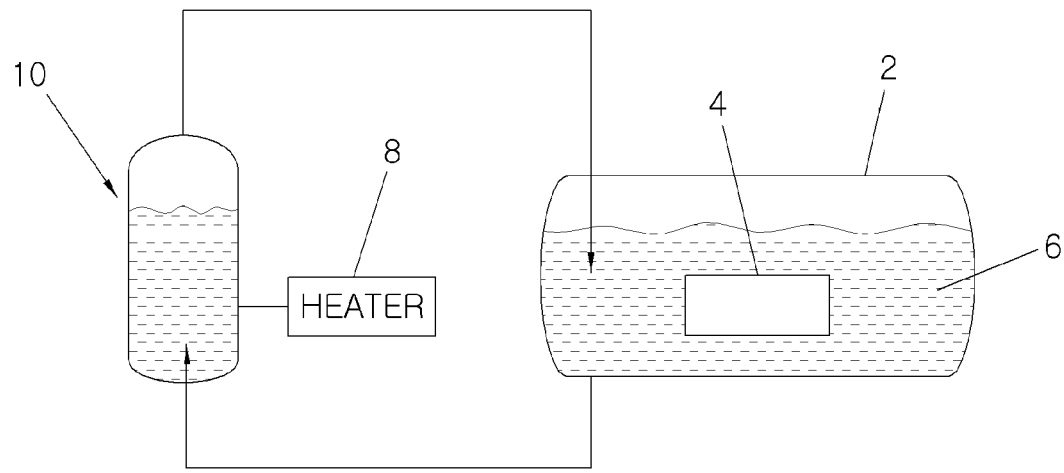
FIG. 1 is a pressure generation system for superconducting power equipment in the related art.

For a better understanding of the present invention, a preferred embodiment of the present invention will be described with reference to the accompanying drawings. The embodiments of the present invention can be modified in various forms, and the scope of the present invention should not be construed as being limited to the embodiments described in detail below. The present embodiments are provided to enable those skilled in the art to more fully understand the present invention. Therefore, the shapes and the like of the elements in the drawings can be exaggeratedly expressed to emphasize a clearer description. It should be noted that the same components are denoted by the same reference numerals in the drawings. Detailed descriptions of well-known functions and constructions which may be unnecessarily obscured by the gist of the present invention are omitted.

The present invention relates to pressure generation apparatus and method for superconducting power equipment in which a pressure system separately provided outside a pressure vessel in the related art is disposed inside a pressure vessel in which liquid nitrogen is stored, in order to apply pressure to the liquid nitrogen in the superconducting power equipment.

Figure 2:
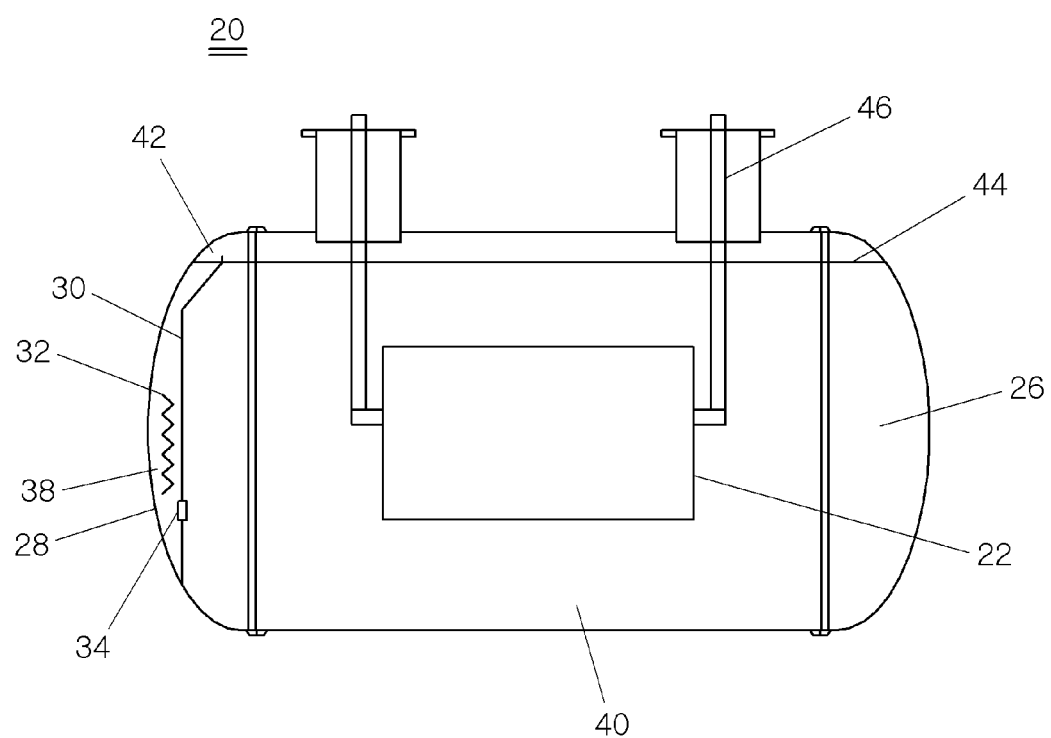
FIG. 2 is a pressure generation system for superconducting power equipment according to the present invention.
Figure 3:
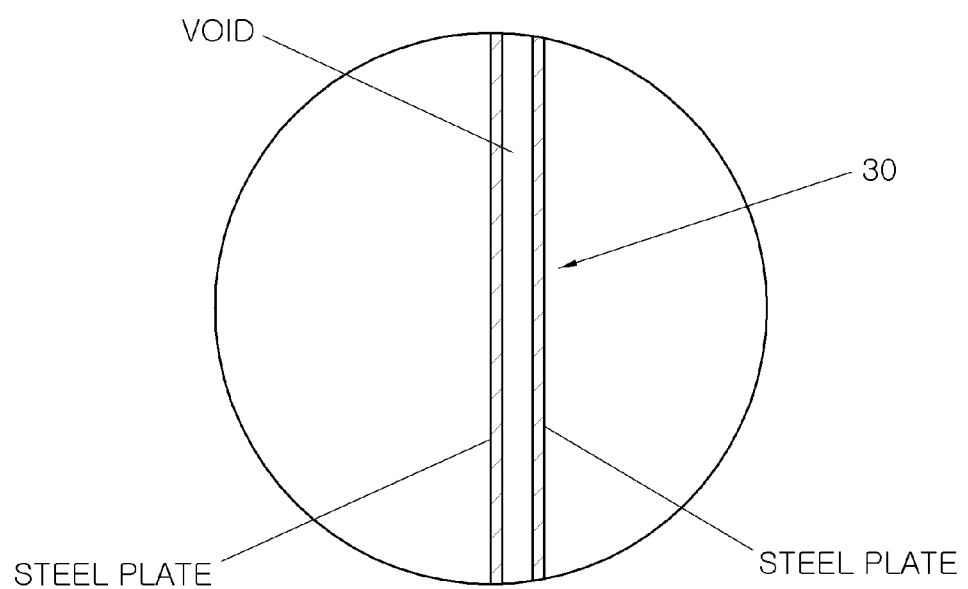
FIG. 3 is a detailed view of a heat insulating partition according to the present invention.
Figure 4:
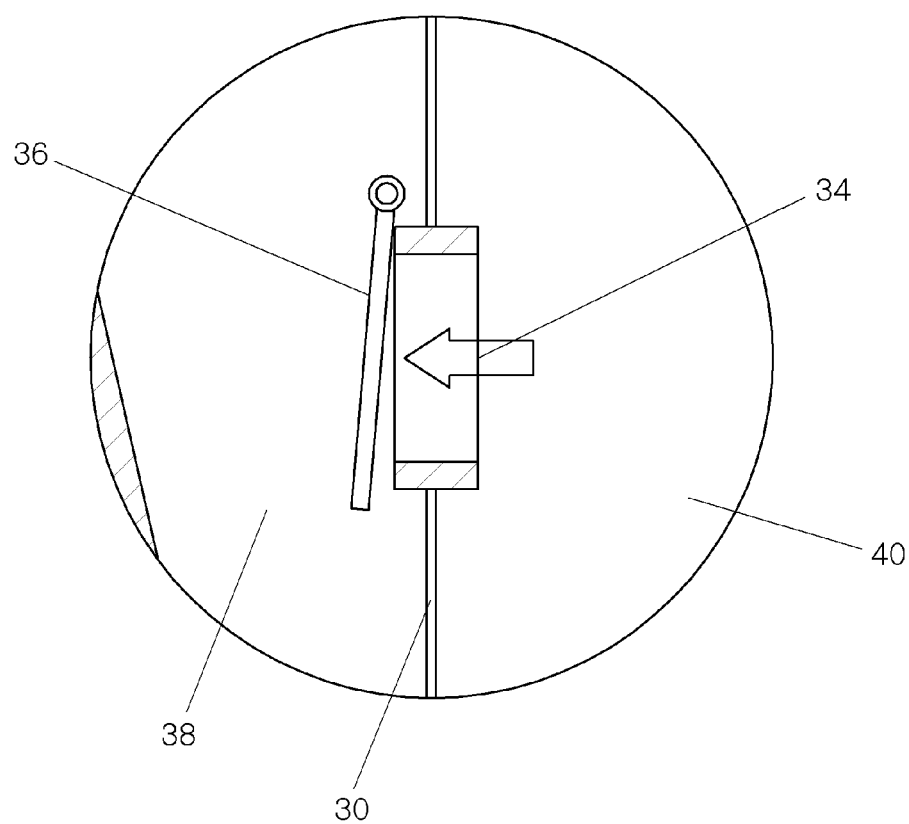
FIG. 4 is a detailed view of a liquid nitrogen inlet according to the present invention.

FIG. 2 is a pressure generating system for superconducting power equipment according to the present invention; FIG. 3 is a detailed view of a heat insulating partition according to the present invention; and FIG. 4 is a detailed view of a liquid nitrogen inlet according to the present invention.

The pressure vessel 20 of the present invention, in which a superconducting fault current limiter 22 and the liquid nitrogen 26 having a liquid level of a predetermined height are stored, is configured so that both ends of a cooling tank having a shape of cylindrical chamber are formed with a dome portion 28 having a dome shape in order to endure inner pressure and the pressure generation device is formed on the side of the dome portion 28 on either end of both ends inside the pressure vessel 20.

The pressure generation device is a device that applies pressure to the liquid nitrogen 26 to maintain the internal pressure of the pressure vessel 20. The pressure generation device is configured to include a partition 30 provided in a direction vertically traversing the dome portion 28, a heater 32 provided between the partition 30 and the dome portion 28, and a liquid nitrogen inlet 34 provided on the partition 30.

When the partition 30 is disposed inside the pressure vessel 20, the lower end of the partition 30 is provided in contact with the lower side of the dome portion 28 and the upper end of the partition 30 is spaced at a certain distance with the upper side of the dome portion 28, in which the height of the partition 30 has to be higher than the liquid level of the liquid nitrogen stored in the storage part 40.

It is shown in FIG. 2 that the partition 30 is parallel for a certain length from the bottom and then bent at an angle from a certain portion to the top, which is due to the inner shape of the dome portion 28. According to the position in which the partition 30 is provided and the liquid level of the liquid nitrogen 26 stored in the pressure vessel 20, the shape of the partition 30 is deformable.

The pressure vessel 20 is divided into the evaporation part 38 and the storage part 40 by the partition 30, in which the space between the partition 30 and the dome portion 28 on one side of the pressure vessel 20 provides the evaporation part 38 in which the liquid nitrogen 26 is evaporated, and the space between the partition 30 and the dome portion 28 on the other side of the pressure vessel 20 provides the storage part 40 in which the liquid nitrogen 26 is stored.

A predetermined amount of the liquid nitrogen 26 stored in the storage part 40 flows into the evaporation part 38 through the liquid nitrogen inlet 34.

As the liquid nitrogen 26 introduced into the evaporation part 38 is evaporated by heating of the heater 32 provided in the evaporation part 38, and thus is changed in phase into gaseous nitrogen and increased in volume, the equilibrium gas pressure inside the evaporation part 38 increases.

In the evaporation part 38, gaseous nitrogen generated by evaporation of the liquid nitrogen moves into the upper side of the storage part 40 through a gas outlet 42, which is a space between the upper end of the partition 30 and the upper side of the dome portion 28.

The gaseous nitrogen moved into the storage part 40 applies pressure to the liquid level of the liquid nitrogen 26 in the storage part 40, whereby a constant pressure is formed throughout the inside of the pressure vessel 20.

Since the gaseous nitrogen which applies pressure to the liquid level of the liquid nitrogen 26 in the storage part 40 is slowly liquefied and reduced in volume as it is brought into contact with the liquid nitrogen 26 in a supercooled state in the storage part 40, the heater 32 must be operated in the evaporation part 38 to allow the liquid nitrogen introduced from the storage part 40 to be constantly be evaporated.

Since the liquid nitrogen stored in the evaporation part 38 is consumed when the liquid nitrogen is continuously evaporated in the evaporation part 38, the liquid nitrogen inlet 34 is installed in the lower side of the partition 30.

The liquid nitrogen inlet 34 is provided with a backflow preventer 36 to prevent the liquid nitrogen introduced into the evaporation part 38 from flowing back to the storage part 40.

The liquid nitrogen inlet 34 should be small enough not to cause thermal diffusion through the liquid, and the backflow preventer 36 may be provided so that heat diffusion from the liquid nitrogen stored in the evaporation part 38 to the liquid nitrogen 26 stored in the storage part 40 is minimized and the liquid level is kept constant at all times.

In addition, in order to prevent the thermal diffusion between the storage part 40 and the evaporation part 38, the partition 30 may be configured with a double steel plate structure having a hollow shape or configured with thermal insulation material.

A pressure generation method of the pressure vessel 20 using the pressure generation apparatus configured as described above includes, moving liquid nitrogen 26 stored in a storage part 40 into an evaporation part 38 through a liquid nitrogen inlet 34 in a lower end of a partition 30;

heating the liquid nitrogen moved into the evaporation part 38 by a heater 32 inside the evaporation part 38;

increasing an equilibrium gas pressure inside the evaporation part 38 as the liquid nitrogen is evaporated by heating of the heater 32 and increase in volume;

moving gaseous nitrogen generated by evaporating the liquid nitrogen above a liquid level of the liquid nitrogen 26 stored in the storage part 40 through a gas outlet 42; and allowing the gaseous nitrogen to apply pressure to a liquid level of the liquid nitrogen 26 stored in the storage part 40, so that a constant pressure is formed inside the pressure vessel 20.

After allowing enabling the gaseous nitrogen to apply pressure 20 to the liquid level of the liquid nitrogen 26 stored in the storage part 40 so that a constant pressure is formed inside the pressure vessel, allowing the gaseous nitrogen to be in contact with the liquid nitrogen and thus be liquefied.

Pressure generation apparatus and method for superconducting power equipment according to the present invention can achieve miniaturization of superconducting power equipment by enabling a pressure system separately arranged outside a pressure vessel to apply pressure to liquid nitrogen in the superconducting power equipment to be disposed inside a pressure vessel, thereby reducing the installation area of pressure tanks, cooling pipes, gas piping, valves, and the like that constitute the pressure system in the related art, and there is no valve for flow of the liquid nitrogen from the existing pressure tank into the pressure vessel so that it is not necessary to control the valve and thus the pressure system can be simplified.

Accordingly, there is an effect that the failure probability of the pressure system is reduced and the performance of the superconducting power equipment is made uniform by above-described configuration, thereby increasing reliability and contributing to stable power system operation.

The embodiments of the pressure generation apparatus and method for superconducting power equipment according to the present invention described above are merely illustrative, and those skilled in the art will appreciate that various modifications and equivalent embodiments are possible. It is therefore to be understood that the invention is not limited to the form set forth in the foregoing description. Accordingly, the true scope of the present invention should be determined by the technical idea of the appended claims. It is also to be understood that the invention includes all modifications, equivalents, and alternatives falling within the spirit and scope of the invention as defined by the appended claims.

The invention claimed is:

1. A pressure generation apparatus for superconducting power equipment, in which a pressure generation device is disposed inside a pressure vessel in which a superconducting fault current limiter and liquid nitrogen are stored, in order to apply pressure to the liquid nitrogen and thus maintain a pressure inside the pressure vessel, wherein the pressure vessel is configured so that both ends of a cooling tank having a shape of a cylindrical chamber are formed as a dome portion having a dome shape, wherein the pressure generation device is formed on a side of the dome portion on either end of both ends inside the pressure vessel, wherein the pressure generation device includes a partition provided in a direction vertically traversing the dome portion, a heater provided between the partition and the dome portion, and a liquid nitrogen inlet provided on a lower side of the partition.

2. The apparatus of claim 1, wherein the pressure vessel is divided into an evaporation part and a storage part by the partition.

3. The apparatus of claim 2, wherein a space between the partition and the dome portion provides the evaporation part in which the liquid nitrogen is evaporated, and a space between the partition and the dome portion on the other side of the pressure vessel provides the storage part in which the liquid nitrogen is stored.

4. The apparatus of claim 3, wherein a predetermined amount of the liquid nitrogen stored in the storage part flows into the evaporation part through the liquid nitrogen inlet.

5. The apparatus of claim 4, wherein the liquid nitrogen flowed into the evaporation part is evaporated by heating of the heater and is increased in volume, so that an equilibrium gas pressure inside the evaporation part is increased.

6. The apparatus of claim 5, wherein gaseous nitrogen generated by evaporating the liquid nitrogen in the evaporation part moves into the storage part through a gas outlet, which is a space between an upper end of the partition and an upper side of the dome portion.

7. The apparatus of claim 6, wherein the gaseous nitrogen moved into the storage part applies pressure to a liquid level of the liquid nitrogen in the storage part, so that a constant pressure is formed inside the pressure vessel.

8. The apparatus of claim 3, wherein the liquid nitrogen inlet is provided with a backflow preventer to prevent the liquid nitrogen flowed into the evaporation part from flowing back to the storage part.

9. The apparatus of claim 2, wherein a height of the partition is higher than a liquid level of the liquid nitrogen stored in the storage part.

10. The apparatus of claim 1, wherein a lower end of the partition is in contact with a lower side of the dome portion, and an upper end of the partition is spaced at a certain distance with an upper side of the dome portion.

11. The apparatus of claim 1, wherein the partition is configured with a thermal insulation material.

12. The apparatus of claim 1, wherein the partition is formed with a double wall structure having a hollow shape.

13. A pressure generation method using the pressure generation apparatus for superconducting power equipment of claim 1, the method comprising:

moving liquid nitrogen stored in a storage part into an evaporation part through a liquid nitrogen inlet in a lower end of a partition;

heating the liquid nitrogen moved into the evaporation part by a heater inside the evaporation part;

increasing an equilibrium gas pressure inside the evaporation part as the liquid nitrogen is evaporated by heating of the heater and increase in volume;

moving gaseous nitrogen generated by evaporating the liquid nitrogen above a liquid level of the liquid nitrogen stored in the storage part through a gas outlet; and allowing the gaseous nitrogen to apply pressure to a liquid level of the liquid nitrogen stored in the storage part so that a constant pressure is formed inside the pressure vessel.

14. The method of claim 13, further comprising:

after allowing the gaseous nitrogen to apply pressure to the liquid level of the liquid nitrogen stored in the storage part so that the constant pressure is formed inside the pressure vessel, allowing the gaseous nitrogen to be in contact with the liquid nitrogen and thus be liquefied.

* * * * *